June 17, 1924.
E. FINELLI
1,497,776
FENDER FOR VEHICLES
Original Filed June 17, 1922   3 Sheets-Sheet 2
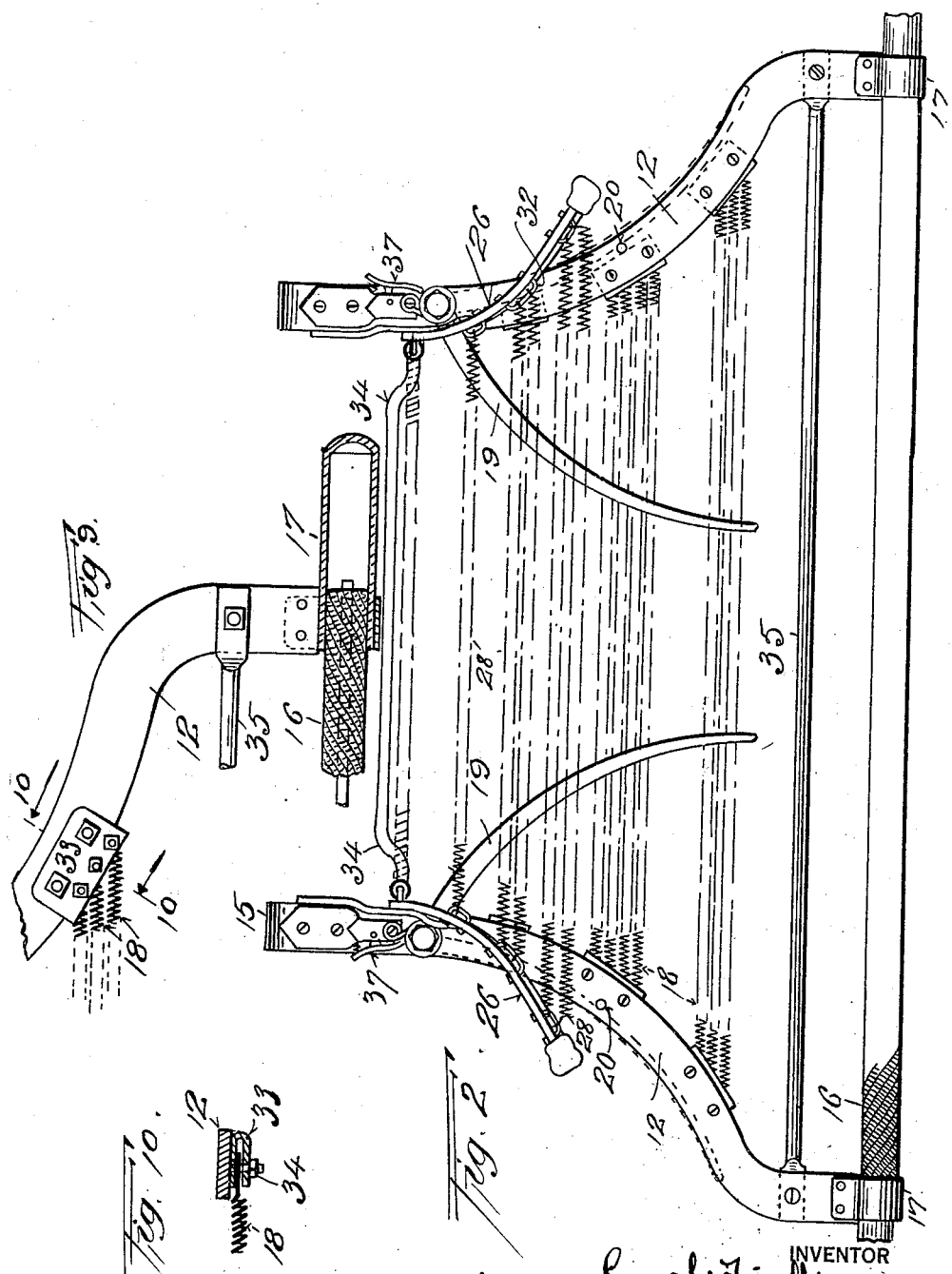
INVENTOR
Ernesto Finelli
BY his ATTORNEYS Darby & Darby June 17, 1924.
E. FINELLI
1,497,776
FENDER FOR VEHICLES
Original Filed June 17, 1922  3 Sheets-Sheet 3
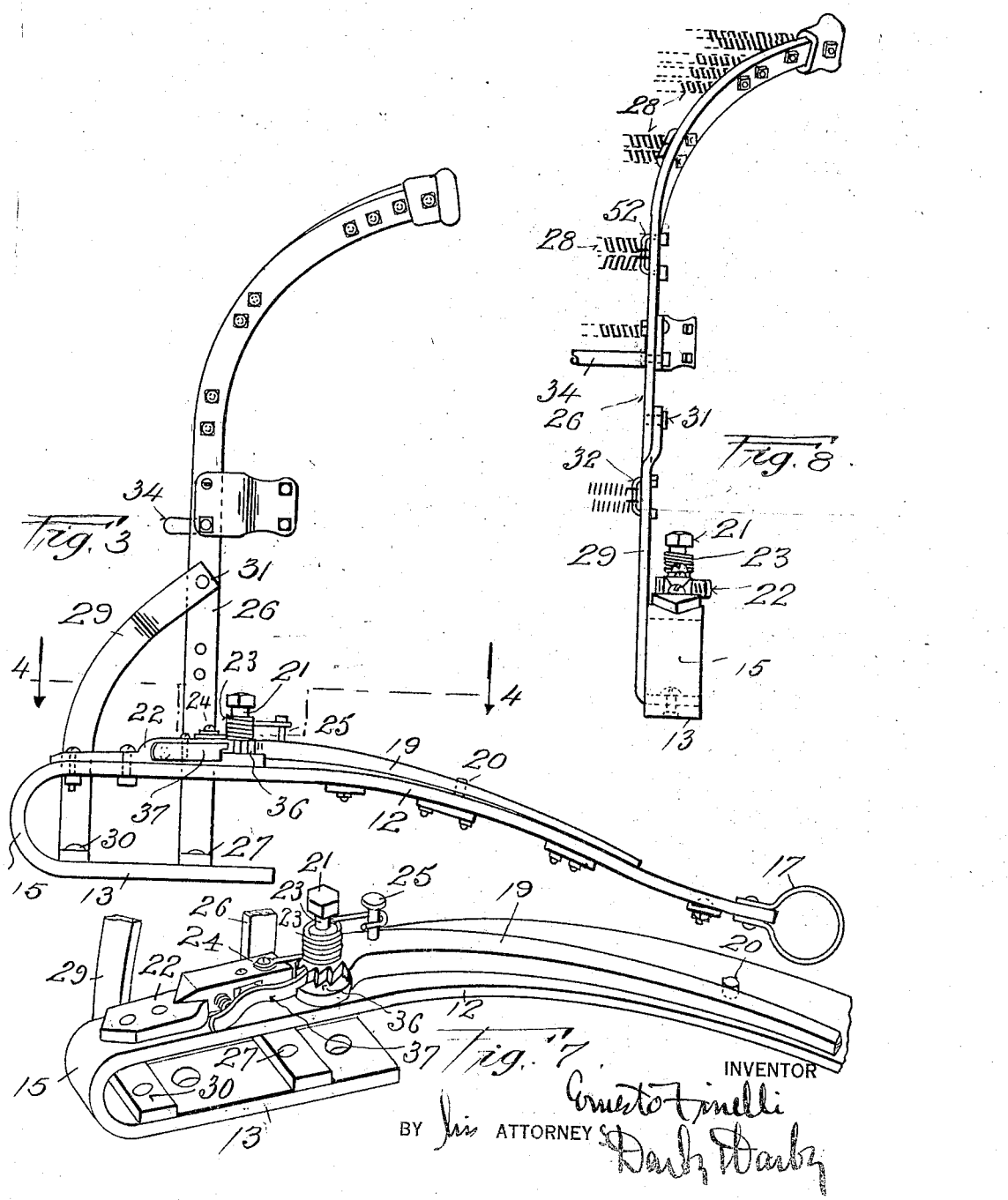

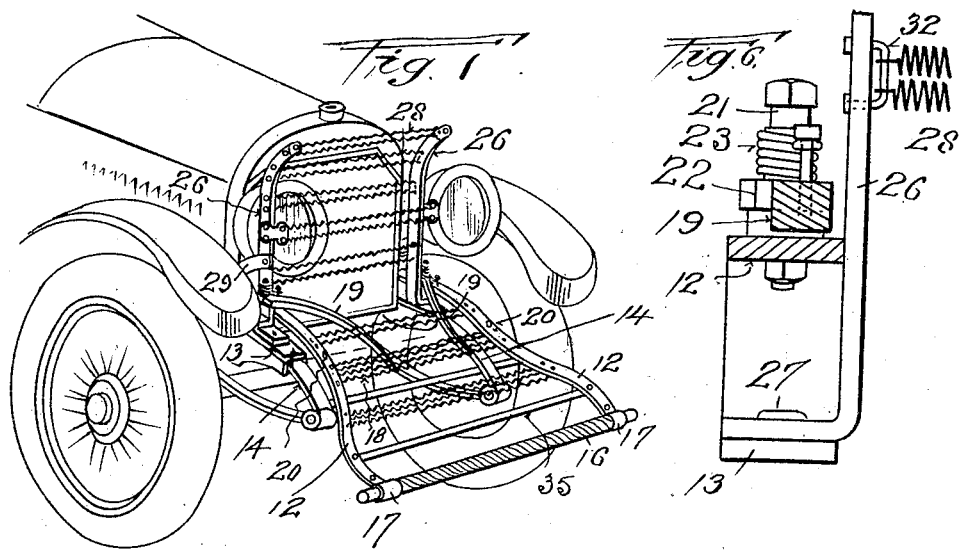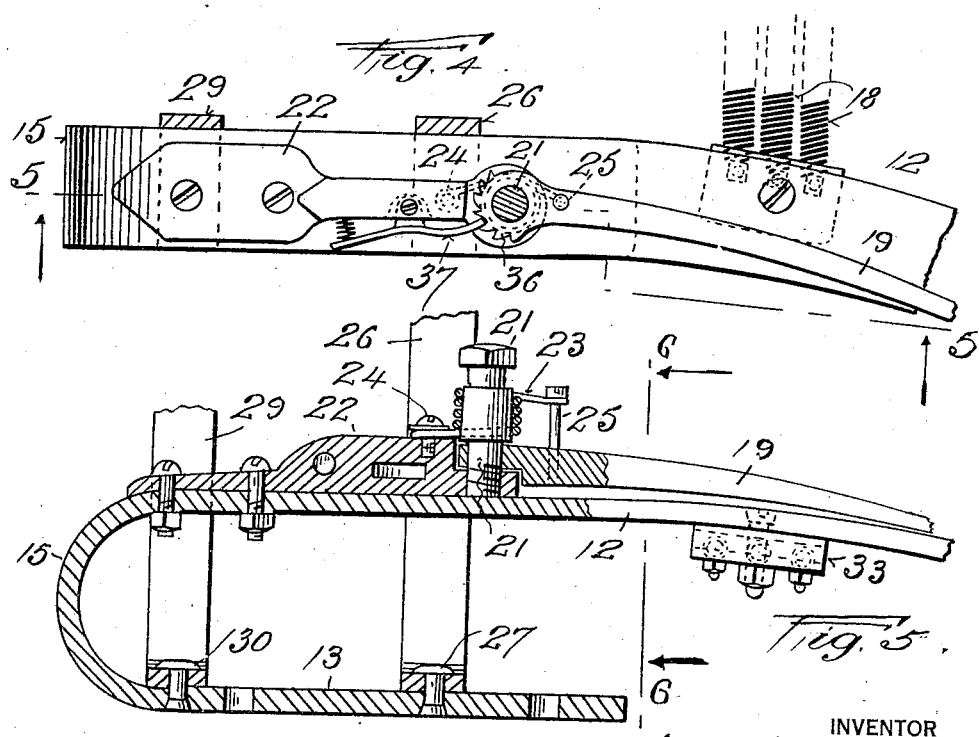

Patented June 17, 1924.

1,497,776

UNITED STATES PATENT OFFICE.

ERNESTO FINELLI, OF NEW YORK, N. Y.

FENDER FOR VEHICLES.

Application filed June 17, 1922, Serial No. 568,966. Renewed January 17, 1924.

*To all whom it may concern:*

Be it known that I, ERNESTO FINELLI, a subject of the King of Italy, residing at New York, county and State of New York, have made a certain new and useful Improvement in Fenders for Vehicles, of which the following is a specification.

This invention relates to fenders for vehicles, and particularly for automobiles.

The object of the invention is to provide a fender structure which is simple, light, durable, easily applied, efficient in operation, and economical to manufacture.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the drawings:—

Fig. 1 is a view in perspective showing the front end of an automobile, and the application thereto of a fender structure embodying the principles of my invention.

Fig. 2 is a top plan view of the fender structure detached.

Fig. 3 is a view in side elevation of the same.

Fig. 4 is a broken detail view in top plan of the rear end of a side member of the fender frame, parts being in section, on the line 4, 4, Fig. 3, looking in the direction of the arrows.

Fig. 5 is a broken detail view in section on the line 5, 5, Fig. 4, looking in the direction of the arrows.

Fig. 6 is a view in section on the line 6, 6, Fig. 5, looking in the direction of the arrows.

Fig. 7 is a broken detached detail view in perspective of the structure shown in Figs. 4 and 5.

Fig. 8 is a detail view in rear elevation of one side of the fender atttachment frame.

Fig. 9 is a broken detail view in top plan of the outer end of one of the side members of the fender attachment frame.

Fig. 10 is a detail view in section on the line 10—10, Fig. 9, looking in the direction of the arrows.

The same part is designated by the same reference numeral wherever it occurs throughout the several views.

In my Patent No. 1,326,487, granted December 30, 1919, I have shown, described and claimed a fender for vehicles, wherein there is employed a fender frame which is pivotally mounted on the frame of a vehicle, and having means to yieldingly maintain the fender frame at an upward limit of its pivotal movement, spring pressed arms being carried by the frame, and arranged, when released, to swing towards each other, the fender frame carrying curtains, one of which, when the fender frame is tripped, being projected horizontally into position for use, and the other being extended in a vertical direction, the pivoted fender frame being released or tripped, and the curtains extended, when the fender strikes an obstruction. The present invention involves improvements over the structure of my said patent in that I dispense with the use of the pivoted fender frame. I also dispense with the extensible curtains. In place of a fender frame which is pivotally mounted upon the vehicle I employ, in accordance with my invention, a fender frame having side members formed of spring material, and curved or reversely bent upon themselves at their inner ends for attachment to the body springs of the vehicle, and extending forwardly from the end of the vehicle, said side members affording the desired resiliency when a weight, such as a falling body, struck by the fender, is imposed upon the fender. In lieu of the extensible curtains, I propose, in accordance with my present invention, to employ flexible connections extending between the side members of the fender frame. By reason of these and other improvements in the fender structure forming the subject-matter of my present invention, I am enabled to greatly reduce the weight and complications of the structure and to provide an exceedingly simple, strong, rigid, durable and efficient fender structure which is economical to manufacture, easily applied to and removed from a vehicle, and which affords protection against injury in case of collision of the vehicle with a person, affording a yielding platform upon which a person struck by the vehicle may be deposited in falling by reason of the collision impact, the yielding of the fender frame being employed to release the clamp arms at opposite sides of the fender frame and to swing toward each other to grasp and retain the body upon the fender and prevent the same from being jolted, or otherwise projected, from the fender, thereby avoiding the danger, and possibility of injury, of the vehicle passing over the person after such person has been projected upon the fender.

Referring specifically to the drawings: reference numerals 12 designate the side members of the fender frame. These are formed of spring material, such, for instance, as steel, and at their inner ends are curved or reversely bent upon themselves as indicated at 13, see Figs. 3, 5 and 7. The lower portions 13 of the side members afford means for clamping the fender frame upon the body springs 14 of the vehicle, as clearly shown in Fig. 1. The reverse bends 15 at the rear ends of the metallic side members 12 afford a desirable resiliency in the frame, permitting it to yield when a body or weight is imposed upon the fender structure. The forward ends of the side members 12 are bent or curved downwardly and outwardly away from each other, as clearly shown in Figs. 1 and 2, and the forward free ends of said members are connected together by a flexible connection 16, constituting the bumper bar of the fender attachment. This bumper bar may be of any desired structure. In the form shown, it consists of a coiled wire structure, and extends at its ends, through sleeves 17 connected to the free ends of the fender frame side members 12. The side members 12 of the frame are connected together by suitable flexible connections 18, which, in this instance, are shown in the form of coiled springs, affording a yielding platform to yieldingly receive a body or weight imposed upon the fender structure, and serving to prevent injury to such body when projected or thrown upon the fender structure. In order to retain a body upon the fender structure, or the apron portion thereof formed by the flexible connections 18, and to prevent the danger of such body falling off of the fender structure and being run over by the vehicle, I employ the retaining arms 19, one pivotally connected with each of the side members 12 of the fender frame, and each urged by spring tension in a direction to rock or swing toward each other. The retainer arms 19 are restrained in retracted position by means of pins 20 on the side members 12, against which the arms 19 abut when the side members 12 are in their normal position, and the retaining arms 19 are in retracted position, as shown, for instance, in Figs. 3 and 7. By reason of the resiliency of the spring metal side members 12 of the frame, it will be seen, when a weight is imposed upon the fender frame, the side members 12 will deflect downwardly, thereby withdrawing the retaining pins 20 from position to form suitable abutments for the arms 19, thereby releasing said arms, and permitting the spring tension imposed on said arms to act thereon to swing or move them toward each other and into position to grasp or clamp the body and retain the same upon the fender. The retaining arms 19 are pivotally mounted at their inner ends upon a stud 21 mounted in a clamp block 22 carried by or secured to the side frame members 12. A coil spring 23, surrounding the pivot bolt 21, having one end connected to the clamp block 22, as indicated at 24, and the other end engaging a pin 25 on the arm 19, afford means for imposing the desired tension upon the arms 19, normally tending to project them inwardly toward each other.

Forming part of the fender framework are the vertically disposed frame members 26, one at each side of the frame. These vertically disposed frame members have their lower ends turned outwardly and riveted or otherwise suitably secured to the end portion 13 of the frame side members 12, as indicated at 27. The upper ends of the vertical side frame members 26 are curved or bent forwardly, as clearly shown in Figs. 1, 3 and 8, and said vertical side members 26 at opposite sides of the frame are connected together by flexible devices 28, shown in this instance as coil springs. This vertical stationary portion of the fender structure, with its resilient cross connecting devices 18, affords a yielding screen to prevent danger of injury or damage to persons thrown violently onto the fender structure, from coming in contact with a solid non-resistant front end portion of the vehicle body.

If desired, the vertical stationary portions 26 of the fender frame may be braced to the lower or horizontally disposed side members 12 of the frame, in any suitable or convenient manner. I have shown brace members 29 for this purpose, said brace members having bent end portions which are riveted, or otherwise suitably connected, as at 30, to the lower portion 13 of the side members 12. At their upper ends the braces 29 are rigidly secured, as at 31, to the vertically extending side members 26.

From the foregoing description it will be seen that I provide an exceedingly simple fender attachment structure which may be applied to or removed from a vehicle very easily and readily by suitable clamp devices operating to secure the same to the portions of the vehicle body springs 14 which extend beyond the end of the vehicle. The entire attachment may be removed by simply releasing the clamps employed for clamping the side members 12 to the vehicle body springs. The bent end portions 13 of the side members 12 of the fender frame being rigidly clamped to the body springs, permit a desirable downward yield or resiliency of the free ends of said side members when a weight or body is imposed upon the device. This yielding spring action not only avoids the danger of injury to the person when thrown onto the fender structure, but is also utilized in releasing the retaining arms 19 by withdrawing from retaining position the abutment stops 20.

The flexible yielding connections 18, 28, may be secured in any suitable or convenient way at their ends to the side members 12 and 26 respectively. For instance, at 32 I have shown loop members connected at their ends to the frame side members, the ends of the flexible connections, or coil springs 28, being fastened to said loop members. In Fig. 10 I have shown another method of clamping or securing the ends of the flexible cross members, wherein said ends are received between the legs of a U-shaped spring stamping 33, and are clamped together and held within the loop of said stamping by bolts 34, said stampings being suitably bolted to the side arms 12.

If desired, and in order to rigidly brace the vertically extending frame members 26 together, and hold the same rigidly in place, a rigid cross bar 34 may be suitably secured at its ends to the respective side members 26. In this case I prefer to deflect the brace bar 34 back of the plane of the flexible connections 28, as clearly shown in Figs. 2 and 3, to avoid danger of injury by reason of a body striking the cross bar 34. If desired, a similar rigid brace bar 35 may be employed to connect together the free ends of the side members 12 of the frame.

If desired, the retaining arms 19 may be retained in their clamping position after being released and moving toward each other as above described. This may be accomplished in many different ways. I have shown one way of accomplishing the desired result wherein the hubs of the arms 19 are provided with ratchet teeth, as indicated at 36, see Fig. 4, with which cooperate a spring pressed arm or pawl 37 pivotally mounted upon the block 22 so that after the retaining arms have swung into their retaining position they are held or retained in that position by the pawl and ratchet devices. In order to reset the arms into retracted position against the tension of the springs 23 the pawl 37 is released from the ratchet teeth 36, thereby permitting said arms to be rocked outwardly or away from each other and into position to engage behind the stop pins 20.

It is to be understood that many variations and changes in the details of structure would readily occur to persons skilled in the art without departure from the spirit and scope of my invention. While, therefore, I have shown and described a specific structure as one practical embodiment of my invention, I do not desire to be limited to the exact details of structure shown and described.

Having now set forth the objects and nature of my invention, and a construction embodying the principles thereof, what I claim as new and useful and of my own invention and desire to secure by Letters Patent of the United States, is,—

1. A safety fender attachment for vehicles, comprising a frame having side members adapted to be detachably connected at one end rigidly to a vehicle, the other ends extending forwardly from the front end of the vehicle, said side members being of spring material to yield vertically under the influence of pressure or weight imposed thereon, and yielding flexible devices connecting said side members.

2. A safety fender attachment for vehicles comprising a frame having side members adapted to be detachably connected at one end to a vehicle, the other ends extending freely from the vehicle, said side members being of spring material to yield under the influence of pressure or weight imposed thereon, yielding flexible devices connecting said side members, in combination with retaining arms pivotally mounted upon said side members, said arms being spring pressed to swing toward each other, means for retaining said arms in retracted position when the fender frame is in its normal position, and means for releasing said arms when said fender frame is yieldingly depressed.

3. A detachable fender structure for vehicles, comprising a frame having metallic side members reversely bent at their inner ends, the reversely bent portions of said side members affording means for detachably attaching said frame to a vehicle, and the free ends of said side members being flexibly resilient, and resilient yielding cross members connecting said side members.

4. A detachable fender structure for vehicles, comprising a frame having metallic side members reversely bent at their inner ends, the reversely bent portions of said side members affording means for detachably attaching said frame to a vehicle, and the free ends of said side members being flexibly resilient, resilient yielding cross members connecting said side members, the combination with spring pressed retainer arms pivotally mounted upon said side members to lock or swing inwardly toward each other, and means carried by said frame side members for retaining said arms in retracted position, said means being released by the resilient depression of said side members.

5. In a fender structure for vehicles, a frame having resilient side members, means to support the inner ends of said side members upon a vehicle, the free ends of said members extending forwardly and downwardly, flexible devices connecting the side members together and forming a yielding platform, and a bumper member connecting the extremities of the free ends of said side members.

6. In a fender structure for vehicles, a frame having resilient side members, means to support the inner ends of said side members upon a vehicle, the free ends of said members extending forwardly and downwardly, flexible devices conecting the side members together, and forming a yielding platform, said side members carrying stops, and spring pressed retaining arms pivotally connected to said frame side members, and arranged to swing inwardly toward each other above said yielding platform, said stops operating to hold said retaining arms in retracted position when said frame side members are in normal position and to release said side arms when said side members are depressed.

7. In a fender structure for vehicles, a frame having resilient side members, means to support the inner ends of said side members upon a vehicle, the free ends of said members extending forwardly and downwardly, flexible devices connecting the side members together and forming a yielding platform, and vertically extending frame side members attached at their lower ends to said first mentioned frame side members, the upper ends of said vertical side members being bent forwardly, and flexible devices connecting said vertical frame side members.

8. In a fender structure for vehicles, a frame having resilient metallic side members reversely curved or bent at their inner ends, the reversely curved bent ends adapted to be secured to a vehicle, the front free ends of said side members extending forwardly and downwardly from the vehicle, flexible devices connecting the said side members.

9. In a fender structure for vehicles, a frame having horizontally disposed resilient metallic side members, and vertically disposed side members connected at their lower ends to the inner ends of the horizontally disposed side members, said horizontal side members adapted to be detachably connected at their inner ends to a vehicle frame, and flexible connections between said horizontally disposed side members, and between said vertically disposed side members, respectively.

10. In a fender structure for vehicles, a frame having horizontally disposed resilient metallic side members, and vertically disposed side members connected at their lower ends to the inner ends of the horizontally disposed side members, said horizontal side members adapted to be detachably connected at their inner ends to a vehicle frame, flexible connections between said horizontally disposed side members, and between said vertically disposed side members, respectively, and spring pressed retaining arms pivotally mounted on said horizontal frame side members normally tending to swing transversely thereof, and toward each other, means to restrain said retaining members retracted, the downward yielding movement of said resilient horizontal side members operating to release said restraining means.

11. In a fender structure for vehicles, a frame having horizontally disposed resilient metallic side members, and vertically disposed side members connected at their lower ends to the inner ends of the horizontally disposed side members, said horizontal side members adapted to be detachably connected at their inner ends to a vehicle frame, flexible connections between said horizontally disposed side members, and between said vertically disposed side members, respectively, and spring pressed retaining arms pivotally mounted on said horizontal frame side members normally tending to swing transversely thereof, and toward each other, means to restrain said retaining members retracted, the downward yielding movement of said resilient horizontal side members operating to release said restraining means, and means to hold said retaining arms in retaining position when released by the horizontal frame side members.

12. In a fender structure for vehicles, a frame having horizontally disposed resilient metallic side members, and vertically disposed side members connected at their lower ends to the inner ends of the horizontally disposed side members, said horizontal side members adapted to be detachably connected at their inner ends to a vehicle frame, flexible connections between said horizontally disposed side members, and between said vertically disposed side members, respectively, and spring pressed retaining arms pivotally mounted on said horizontal frame side members normally tending to swing transversely thereof, and toward each other, means to restrain said retaining members retracted, the downward yielding movement of said resilient horizontal side members operating to release said restraining means, and pawl and ratchet devices to hold said retaining arms in retaining position.

13. In a fender structure for vehicles, a frame having resilient metallic side members reversely curved or bent at their inner ends, the reversely curved bent ends adapted to be secured to a vehicle, the front free ends of said side members extending forwardly and downwardly from the vehicle, holding devices carried by said side members, and flexible devices connected at their ends to the holding devices on said respective side members.

14. In a fender structure for vehicles, a frame having resilient metallic side members reversely curved or bent at their inner ends, the reversely curved bent ends adapted to be secured to a vehicle, the front free ends of said side members extending forwardly and downwardly from the vehicle, spring clip members respectively connected to said side members, and flexible devices having their respective ends received and secured in said spring clip members.

In testimony whereof I have hereunto set my hand on this 9th day of June A. D., 1922.

ERNESTO FINELLI.